Dec. 1, 1964   F. L. BAIER   3,159,513
COATING FOR LINEAR MATERIAL AND METHOD OF APPLICATION
Filed Sept. 20, 1961   2 Sheets-Sheet 1

INVENTOR
*Frederick L. Baier*

BY Natt M Emery Jr.
ATTORNEY

Dec. 1, 1964    F. L. BAIER    3,159,513
COATING FOR LINEAR MATERIAL AND METHOD OF APPLICATION
Filed Sept. 20, 1961    2 Sheets-Sheet 2
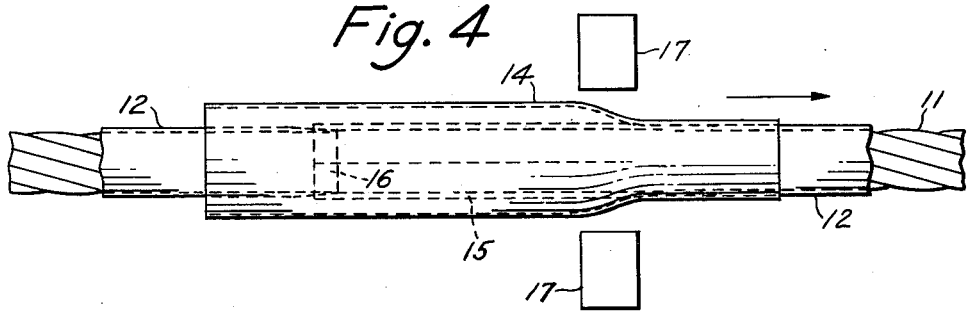
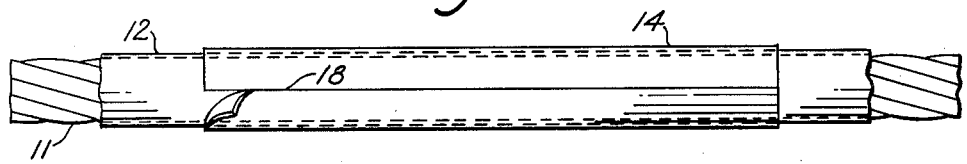
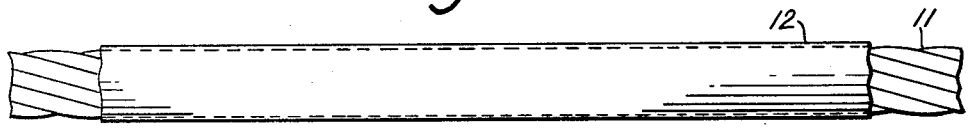
INVENTOR
Frederick L. Baier
BY Natt M Emery Jr.
ATTORNEY

United States Patent Office 3,159,513
Patented Dec. 1, 1964

3,159,513
COATING FOR LINEAR MATERIAL AND METHOD OF APPLICATION
Frederick L. Baier, Williamsport, Pa., assignor to Bethlehem Steel Company, a corporation of Pennsylvania
Filed Sept. 20, 1961, Ser. No. 139,524
4 Claims. (Cl. 156—49)

This invention relates to a method of applying a plastic coating to a linear material. More specifically, the invention is directed to a method of applying a synthetic plastic resin coating to linear material such as metal rods and wire cable.

In certain applications where wire cable, such as rope or strand, is used in the form of an endless loop, the cable is frequently coated with a plastic material for the purpose of reducing corrosive action on the cable, and in certain conveyor rope operations, to reduce noise.

In coating a wire rope with a plastic material, the coating is frequently applied by extrusion. In forming an endless loop, as is necessary in a conveyor rope, the rope ends are spliced by interweaving individual strands of the rope. Splicing necessitates removal of the coating for a distance of some feet at the ends of the rope, and when the splice is completed, it is necessary to re-coat the splice with plastic material. This coating of the splice in endless ropes, or in ropes generally mounted on reels, presents certain application difficulties. Prior methods of coating splices have not been entirely satisfactory from the standpoint of coating surface smoothness or diameter uniformity, both properties of which are desirable in a conveyor rope, for example. In addition, prior methods have often produced a coating having a flash, or fin of excess coating, which had to be removed, and which usually left the surface non-uniform.

I have found that in the coating of splices or joints in a plastic coated rope, a very satisfactory splice coating can be produced by applying to the splice, first, a layer of plastic of a composition similar to that used on the main length of the rope, for example, nylon, and covering this first layer with a tube or coil of an irreversibly heat-shrinkable thermoplastic resin. By using as the tube material a resin such as heat-shrinkable irradiated polyethylene, which has a radial shrinkage, or contractile, factor of as much as 25% when distended and subsequently heated, a tube of a properly chosen diameter can be made to shrink, upon the application of heat, so that it will exert sufficient pressure on the inner plastic layer to mold the inner layer securely around the core material. The molding plastic tube is, of course, placed on the rope before the splice is made, and then brought into position around the splice prior to molding. Heat is applied during the molding operation to cause the outer tube to shrink upon and mold the inner plastic layer, and to bring the inner layer to a plastic state, whereby the inner layer is readily molded, and consolidated so that there are no openings in the surface of the layer. When, for example, a wire rope splice is being coated, the coating layer is not only shaped to a smooth outer contour; the coating is also firmly squeezed into the interstices of the splice. The outer molding tube should be capable of shrinking, as well as of retaining its strength, at a temperature at which the inner coating material can be molded and consolidated, without any significant degradation of the inner coating material. After heating for a time sufficient to perform the molding operation, the entire structure is allowed to cool, and the inner coating layer permitted to take a permanent set. In most cases, it will be desirable to remove the mold layer, once the coating layer has been formed and cooled. This can be done readily by merely slitting the molding resin and stripping it from the inner layer. The coating originally applied to the core, and that applied at the splice, would, normally, be made from the same type of resin. The coating resin applied at the splice should preferably be heat-sealable with the resin originally used to coat the core material, so that a tight, smooth bond can be made at the interfaces.

While in this invention, the plastic resin from which the molding tube is made must be of the thermoplastic, heat shrinkage type, the coating material may be any thermoplastic plastic, which is moldable at low pressure, and which has satisfactory properties as a coating material. The term plastic, as used herein, refers to those compounds known as synthetic plastics.

In this invention, the easiest means of applying the coating plastic prior to forming, is by merely wrapping the resin, in either sheet or tape form, around the core.

It is an object of this invention to provide a means for forming a smooth, adherent plastic coating on metal articles, particularly those of linear configuration.

In the drawings:

FIGURE 4 shows the heat-shrinkable tube, which has been slipped over the split plastic tube, being passed, with the rope of FIG. 3, through a heat source.

FIGURE 5 shows the heat-shrinkable tube in a slit condition prior to being stripped from the rope section.

FIGURE 6 shows the finished coating on the wire rope.

Figure 1:
FIGURE 1 shows a length of a plastic-coated wire rope from a portion of which the coating has been removed.

As one example by which the process of my invention may be performed, a 5/16 inch wire rope, shown as 11 in FIG. 1, which had been extrusion-coated with nylon 12, was used as the rope to be spliced into an endless loop. The extruded nylon coating was made from a nylon having a fusion temperature of about 430° F. At the two ends of the rope to be joined in the splice, the coating was stripped off from each end for a distance sufficient to permit splicing of the ends together. A sixteen and one-half foot length of irradiated polyethylene tube 14 of FIGURE 2, having an inside diameter of 0.5 inch, was slipped over one end of the rope. The polyethylene tube is heat-shrinkable, and is designed to shrink upon the application of heat at a temperature in excess of 235° F. When so heated, the tube contracts to an inside diameter of 0.334 inch. The tube is able to withstand a temperature of 575° F. for one hour without significant degradation of properties. The rope was spliced as shown at 13, FIGURE 1, by interweaving the strands to form an uncoated section of approximately fifteen feet.

Figure 2:
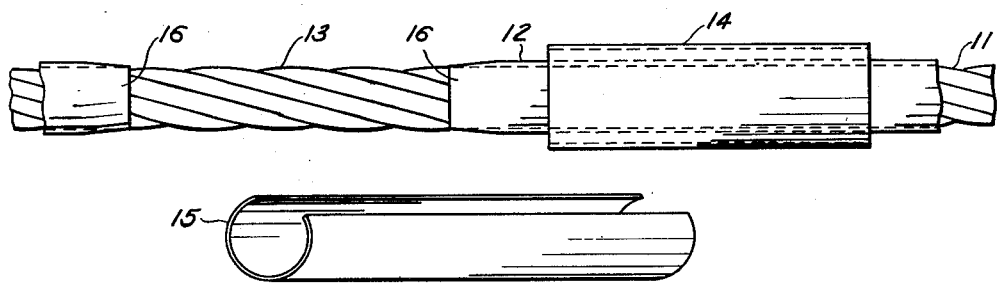
FIGURE 2 shows a heat-shrinkable tube slipped over the rope of FIGURE 1, with a split tube of heat-bondable plastic material ready to be placed over the bare section of the rope.
Figure 3:
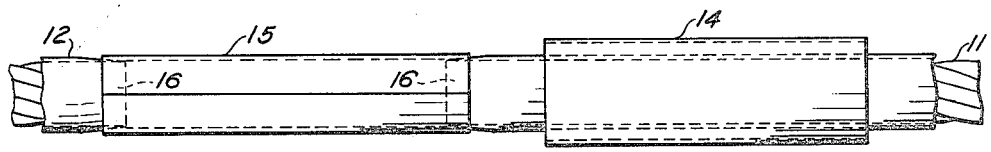
FIGURE 3 shows the split plastic tube wrapped around the bare section of the rope of FIGURE 2.

A piece of split nylon tubing 15 of FIGURE 2, having an inside diameter of 0.336 inch and an outside diameter of 0.396 inch (approximately 30 mil wall thickness) was placed over the uncoated portion of the rope, with its ends overlapping the chamfered ends of the original coating. The tubing was made from a nylon having a fusing temperature of about 300° to 320° F. The low fusion temperature of the coating material is advantageous in forming the splice covering, since the lower heat is easier to attain, and is also well below the temperature at which the polyethylene tubing is subject to heat damage.

The irradiated polyethylene tube 14 was next moved along the wire rope until it was centered over the split nylon tube 15, with the ends of tube 14 slightly overlapping the original nylon coating.

Prior to heating the assembly just described, a strip of heat sensitive paint, having a melting temperature of 325° F., was applied to the heat-shrinkable polyethylene tubing from end to end. The paint was used merely as a convenient means by which the temperature could be determined and controlled during the subsequent heating operation. Other methods of temperature determination and control will be apparent; for example, if the outer molding tube 14 is transparent, the fusing of the inner layer 15 of plastic material can be monitored visually.

The whole assembly, comprising the spliced section of wire rope, the inner layer of split tubing and the outer layer of polyethylene tubing was next drawn from end to end through a heating zone consisting of three infra-red heat lamps arranged around the rope at a spacing of 120° from each other. During heating, the polyethylene tube contracted tightly around the wire rope and the split nylon tube. The speed of passage of the rope through the heating area was such that the heat sensitive paint on the polyethylene tube was just melted as it passed under the infra-red lamps. This heating step is shown graphically in FIGURE 4, where the lamps are indicated at 17, and the overlap between the nylon tube 15 and the original nylon coating 12 is shown at 16. It is preferable, in applying heat in the coating operation, to pass the article being coated through the heating zone from end to end. In this manner, air is forced out of the mold, and a more uniform coating results.

When the assembly had been drawn through the heating zone for its entire length, the assembly was permitted to cool. The wall of the radially contracted polyethylene tubing was then slit along the line 18 of FIGURE 5 and stripped from the rope, leaving on the rope a smooth, uniform and concentric coating of nylon. In addition, the coating was found to have bonded mechanically with the surface of the rope splice by flowing, while fused and under the pressure exerted by the polyethylene mold tube, into the interstices of the splice.

While the just-described method is the preferred means of performing my invention, there may be instances, for example when coating linear articles of irregular linear form, where it would be desirable to use a heat-shrinkable plastic tape, in place of the heat-shrinkable plastic tube used in the foregoing description. When heat-shrinkable tape is used as the molding medium, it should be wound around the inner plastic layer in spiral form, so that the spirals overlap to form a unitary shell, similar to that formed by the tube mold.

In most cases, the outer molding layer of plastic will be removed from the inner plastic layer without difficulty. In those instances where, because of the nature of the plastic materials used, there is a tendency to sticking between the two layers, sticking can be overcome by use of a release agent, such as silicone grease. The release agent may be spread over the inner plastic layer, prior to enclosing it in the molding material.

While in the example described above, nylon and irradiated polyethylene were used as the inner coating layer and the outer molding layer respectively, it is to be understood that other plastic materials may be used.

For example, any plastic having significant heat-shrinkable properties, and which shrinks at a temperature low enough not to degrade the plastic inner layer, and which retains its strength at the temperature at which the plastic inner layer can be consolidated, may be used as the molding material. Examples of other materials which may be used as molding agents in my invention are polyvinyl chloride, polyvinylidene chloride and oriented polystyrene, polypropylene and certain fluorocarbons.

The inner coating layer may be any thermoplastic synthetic plastic which is capable of being applied to the article to be coated and which can be consolidated under heat and pressure to produce the desired properties in the coated article. Thermoplastic plastics, other than nylon, which might be used in the coating layer are acrylic resins, such as methyl methacrylate, and the various polyvinyl compounds including polyvinyl acetate, polyvinylidene chloride, etc.

Although this invention has been described in connection with the coating of wire rope, the invention is not limited thereto, it being readily adaptable to the formation of coatings on rods, bars, tubes and other linear articles, including those having irregular shapes.

It will be recognized that the present invention provides a very practical and convenient method of coating small uncoated sections of otherwise coated objects, and also of coating entire small objects, particularly linear articles, which method not only does not require any complicated or expensive permanent molding or other equipment, but which also results in a very uniform and superior coating.

I claim:

1. A method of applying a covering to a splice in a wire rope which comprises placing a covering of a heat-bondable synthetic plastic material around said splice, placing over the heat-bondable material a unitary tube of a radially-shrinkable synthetic plastic material, applying heat to the area of the splice covered by the heat-bondable material and the shrinkable tube, causing the shrinkable tube to contract around the heat-bondable material while the heat is applied to mold the heat-bondable material and improve the bonding thereof under the influence of the applied heat, and removing the contracted tube from the article after cooling.

2. The method of applying a covering to a splice in a wire rope which comprises placing a covering of nylon around said splice, placing over the nylon a unitary tube of a heat-shrinkable irradiated polyethylene, applying heat to the area of the splice covered by the nylon and the polyethylene tube, causing the polyethylene to contract around the nylon while the heat is applied and thereby molding the nylon and improving the bonding thereof under the influence of the applied heat and removing the contracted tube after molding is completed.

3. The method of applying a nylon covering to wire cable which comprises placing a split nylon tube around said cable, placing over the nylon a unitary tube of an irreversibly heat-shrinkable irradiated polyethylene, applying heat to the area of the cable covered by the nylon and the polyethylene, causing the polyethylene tube to contract around the nylon while the heat is applied and thereby molding the nylon and improving the bonding thereof under the influence of the applied heat and removing the contracted tube from the cable after cooling.

4. A method of reapplying a smooth even diameter flashing free plastic coating to a spliced area of a plastic coated wire cable from which area the original plastic coating has been removed to effect the splicing operation comprising:

(a) placing a tube of oriented thermoshrinkable plastic having a slightly larger inside diameter than the desired plastic coating and somewhat longer than the length of the final splice area to be recoated over one end of the cable to be spliced, (b) splicing the cable, (c) applying a thermoplastic similar to the original plastic coating of the cable to the area of the splice, (d) sliding the thermoshrinkable tube over the spliced area, (e) passing the spliced area with the thermoplastic coating and superimposed thermoshrinkable tube through a heating zone progressively from one end to the other to progressively contract the tube around the splice and fuse the thermoplastic whereby the thermoplastic is intimately and uniformly molded around the spliced area, (f) cooling the spliced area, (g) slitting the contracted tube, (h) and stripping the contracted tube from the splice area to expose a smooth surfaced uniform diameter plastic coating molded around the spliced area of the cable.

References Cited in the file of this patent

UNITED STATES PATENTS

| | | |
|---|---|---|
| 2,993,820 | Marshall | July 25, 1961 |
| 3,033,727 | Cram et al. | May 8, 1962 |
| 3,035,113 | Danchuk | May 15, 1962 |

UNITED STATES PATENT OFFICE
CERTIFICATE OF CORRECTION

Patent No. 3,159,513                              December 1, 1964

Frederick L. Baier

It is hereby certified that error appears in the above numbered patent requiring correction and that the said Letters Patent should read as corrected below.

Column 2, line 17, for "heat shrinkage" read -- heat-shrinkable --; column 3, line 17, for "strip" read -- stripe --.

Signed and sealed this 6th day of April 1965.

(SEAL)
Attest:

ERNEST W. SWIDER                          EDWARD J. BRENNER
Attesting Officer                            Commissioner of Patents